(12) United States Patent
Panasik et al.

(10) Patent No.: US 7,819,371 B2
(45) Date of Patent: Oct. 26, 2010

(54) UNIVERSAL SUSPENDED ANCHOR SYSTEM

(75) Inventors: Cheryl L. Panasik, Elburn, IL (US); Norbert K. Kolodziej, Park Ridge, IL (US); Andrea M. Basalay, Hoffman Estates, IL (US); Martin J. Nilsen, Hampshire, IL (US)

(73) Assignee: Illinois Tool Works Inc., Glenview, IL (US)

( * ) Notice: Subject to any disclaimer, the term of this patent is extended or adjusted under 35 U.S.C. 154(b) by 57 days.

(21) Appl. No.: 11/772,351

(22) Filed: Jul. 2, 2007

(65) Prior Publication Data

US 2009/0008514 A1  Jan. 8, 2009

(51) Int. Cl.
*A47H 1/10* (2006.01)
(52) U.S. Cl. ............ 248/327; 248/58; 248/59; 248/65; 248/72; 248/73; 248/340; 411/81; 411/172
(58) Field of Classification Search .......... 248/58, 248/59, 65, 72, 73, 327, 340; 411/81, 103, 411/105, 172, 400
See application file for complete search history.

(56) References Cited

U.S. PATENT DOCUMENTS

| | | | | |
|---|---|---|---|---|
| 952,053 | A | * | 3/1910 | Tarleton ............ 248/59 |
| 1,039,587 | A | * | 9/1912 | Pearce ............ 248/59 |
| 1,145,385 | A | | 7/1915 | Maple |
| 1,155,243 | A | | 9/1915 | Jordahl |
| 1,360,200 | A | | 11/1920 | Dowd |
| 1,528,777 | A | | 3/1925 | Marting |
| 1,579,419 | A | * | 4/1926 | Tomkinson ............ 248/59 |
| 1,709,288 | A | | 4/1929 | Sutherland |
| 1,837,930 | A | | 12/1931 | Waite |
| 1,856,356 | A | | 5/1932 | Owen |
| 1,941,211 | A | | 12/1933 | Inglee |
| 1,960,003 | A | | 5/1934 | Ford |
| 2,004,462 | A | | 6/1935 | Bush |
| 2,064,290 | A | * | 12/1936 | Campbell et al. ............ 248/72 |
| 2,375,513 | A | * | 5/1945 | Bach ............ 248/59 |
| 2,592,315 | A | | 4/1952 | Evans |
| 2,632,620 | A | | 3/1953 | Hurley |
| 2,676,680 | A | * | 4/1954 | Kindorf ............ 403/22 |
| 2,944,313 | A | * | 7/1960 | Reiland ............ 24/535 |
| 3,208,560 | A | | 9/1965 | Cote |

(Continued)

FOREIGN PATENT DOCUMENTS

DE  3625885  2/1988

(Continued)

OTHER PUBLICATIONS

Unistrut Corporation; Unistrut Product Manual; 2002.

*Primary Examiner*—Anita M King
*Assistant Examiner*—Michael McDuffie
(74) *Attorney, Agent, or Firm*—Levenfeld Pearlstein, LLC

(57) ABSTRACT

A universal suspended anchor system is configured for attaching to a frame having a first vertical wall and a second vertical wall having first and second bearing surfaces, respectively adjacent to and aligned with one another and defining a gap formed between the adjacent bearing surfaces. The universal suspended anchor system includes a bracket and a threaded block affixed to the bracket. The anchor is inserted into the gap and rests on the bearing surfaces. The anchor enables suspension of building service lines including water, HVAC and electrical services.

14 Claims, 6 Drawing Sheets

U.S. PATENT DOCUMENTS

| | | | | |
|---|---|---|---|---|
| 3,894,707 | A * | 7/1975 | Heard | 248/230.9 |
| 4,080,712 | A | 3/1978 | Weber | |
| 4,097,015 | A | 6/1978 | Frishman | |
| 4,099,694 | A | 7/1978 | Horwitz | |
| 4,119,285 | A * | 10/1978 | Bisping et al. | 248/72 |
| 4,127,252 | A | 11/1978 | Splawn | |
| 4,186,902 | A * | 2/1980 | Simons | 248/73 |
| 4,240,602 | A * | 12/1980 | McDonald | 248/58 |
| 4,416,095 | A | 11/1983 | Truluck | |
| 4,524,935 | A * | 6/1985 | Rumble | 248/62 |
| 4,544,119 | A | 10/1985 | Kellett | |
| 4,575,295 | A | 3/1986 | Rebentisch | |
| 4,662,590 | A * | 5/1987 | Hungerford, Jr. | 248/72 |
| 4,679,754 | A * | 7/1987 | Richards | 248/68.1 |
| 4,790,701 | A * | 12/1988 | Baubles | 411/85 |
| 4,805,855 | A | 2/1989 | Kirby | |
| 4,993,676 | A | 2/1991 | Fitts et al. | |
| 5,082,216 | A * | 1/1992 | Roth | 248/62 |
| 5,085,393 | A | 2/1992 | Ryan | |
| 5,154,579 | A | 10/1992 | Rezek | |
| 5,259,165 | A | 11/1993 | Koyama | |
| 5,351,926 | A | 10/1994 | Moses | |
| 5,873,550 | A * | 2/1999 | Phillips | 248/73 |
| 5,937,073 | A | 8/1999 | Van Gleson | |
| 6,012,691 | A * | 1/2000 | van Leeuwen et al. | 248/228.3 |
| 6,086,300 | A * | 7/2000 | Frohlich | 411/84 |
| 6,452,095 | B1 | 9/2002 | Perrault | |
| 6,511,028 | B1 * | 1/2003 | Gretz | 248/222.52 |
| 6,609,343 | B1 | 8/2003 | Litten | |
| 6,672,545 | B1 * | 1/2004 | Persing | 248/58 |
| 6,837,661 | B2 | 1/2005 | Schwarz et al. | |
| 6,868,647 | B2 | 3/2005 | Poldmaa | |
| 7,044,701 | B2 | 5/2006 | Herb | |
| 7,410,140 | B2 | 8/2008 | Hartwick | |
| 7,410,141 | B2 * | 8/2008 | Hartwick | 248/317 |
| 2004/0165965 | A1 | 8/2004 | Unverzagt et al. | |
| 2005/0056757 | A1 * | 3/2005 | Hartwick | 248/327 |
| 2005/0252135 | A1 | 11/2005 | Hartwick | |
| 2006/0254190 | A1 | 11/2006 | Hunt | |

FOREIGN PATENT DOCUMENTS

| | | |
|---|---|---|
| DE | 19734629 | 9/1998 |
| EP | 1061277 | 12/2000 |

* cited by examiner

UNIVERSAL SUSPENDED ANCHOR SYSTEM

BACKGROUND OF THE INVENTION

The present invention is directed to an industrial hanger. More particularly, the present invention pertains to a universal suspended anchor system.

An industrial hanger generally refers to a device used for securing building services to the primary steelwork of a structure. Industrial hangers are widely used in industrial-type applications. Typically, industrial hangers are used to secure items such as pipes, cable, and conduit (e.g., water and related services, heating, ventilation, and air conditioning piping and conduit and electrical cables) from the steel joists or trusses located overhead in industrial buildings.

Oftentimes, however, industrial hangers are difficult and costly to install. Characteristically, industrial hangers cannot be installed from the floor: an installer must use a ladder or lift to elevate him or herself to the height of the roof trusses and then proceed to bolt or weld previously known industrial hanger systems to the truss. Unfortunately, large equipment such as electrical or heating and ventilation systems can cause obstructions such that elevating to the height of the truss or otherwise installing the industrial hangers poses a significant challenge.

Another challenge confronted by users of known industrial hangers is that many hangers can exert forces unevenly on the sides of the joists from which the hanger is affixed. Often, the industrial hanger does not distribute the weight uniformly on the truss/joist; because some industrial hangers are mounted on one side of a joist, the load is concentrated on one leg or side of a joist than another. This uneven distribution of load on a weight-bearing surface can be problematic.

In addition, known hanger systems often rotate or move and typically have no seismic restraints to reduce rotational and translational movement.

Finally, existing industrial hangers that can be mounted to trusses from the floor require a seller or user to stock extra inventory such as different lengths of rod or other parts to reach different heights for different installations.

Accordingly, there is a need for a universal suspended anchor system. Desirably, such a universal suspended anchor system is easy to install from the floor and provides for uniform distribution of load, as well as seismic restraint. More desirably, such an anchor is readily made and usable, while keeping parts to a minimum, and has a high degree of integrity at reduced cost.

BRIEF SUMMARY OF THE INVENTION

A universal suspended anchor system is configured for attaching to an associated frame, the associated frame having a first vertical wall and a second vertical wall, the first vertical wall having a first bearing surface and the second vertical wall having a second bearing surface, the first and second bearing surfaces adjacent to and aligned with one another defining a gap between the adjacent bearing surfaces.

The universal suspended anchor system is comprised of a T-bracket and a threaded block. The threaded block is welded to the bracket and the bracket and the threaded block define a unit configured to accept or couple with a threaded rod. In one embodiment, the threaded block is a square threaded block and is welded to a T-bracket, with the threaded block welded to the bracket on either a tabbed side or a flat side of the T-bracket. The threaded block is threaded internally to accept a mating threaded rod. The T-bracket has tabs on its lateral aspects, configured to engage or rest on bearing surfaces of the frame, minimizing rotational movement of the anchor system.

Desirably, the anchor system is easy to install from below, providing for uniform distribution of load and rotational restraint while resting on bearing surfaces, in addition to providing for seismic restraint and reducing translational movement. More desirably, the anchor is readily made and usable, while keeping parts to a minimum, and has a high degree of integrity at reduced cost.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
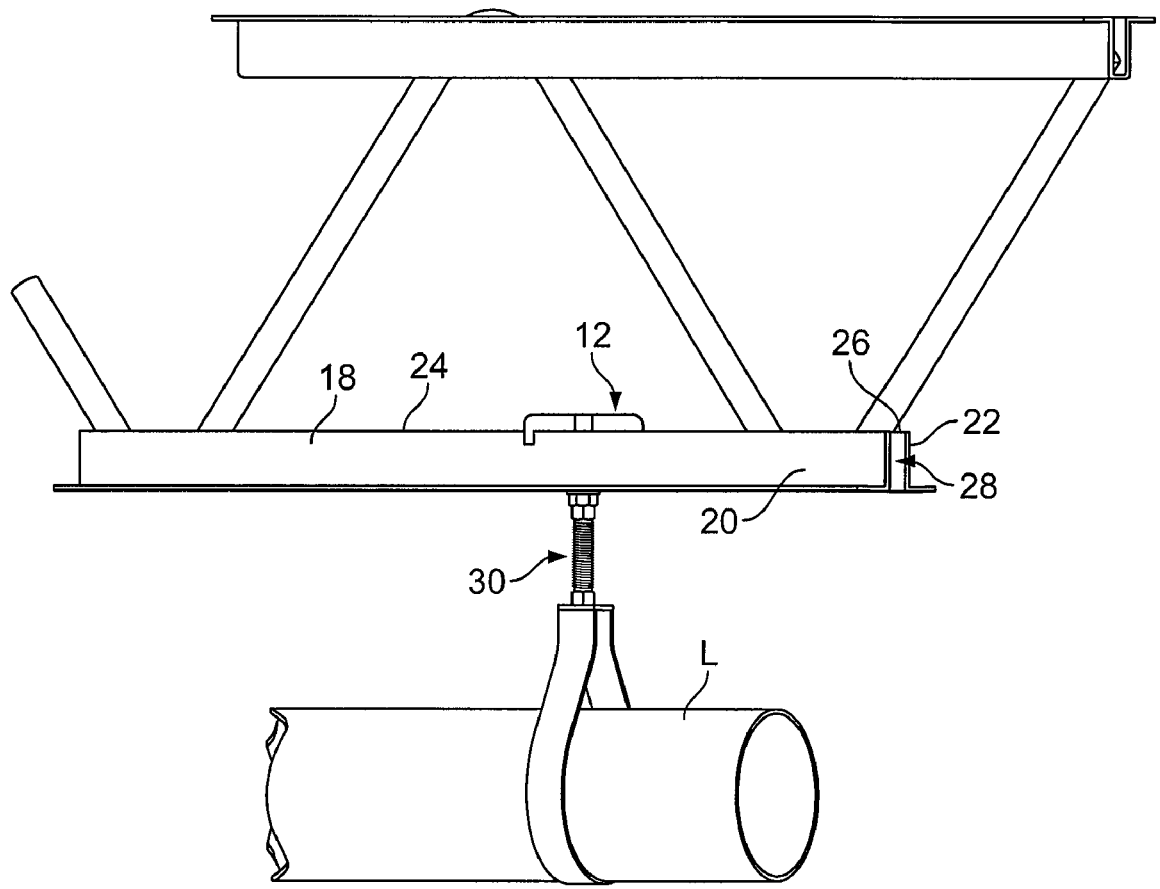
FIG. 1 is a perspective view of an embodiment of the present invention, the universal suspended anchor system mounted to a truss.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIG. 1, a universal suspended anchor system is shown, attached to a truss 18. The truss 18 has two adjacent angle irons 20 and 22, the first angle iron 20 having a first bearing surface 24 and the second angle iron 22 having a second bearing surface 26, the first and second bearing surfaces 24, 26 adjacent to and aligned with one another such that a gap 28 is formed between the adjacent angle irons 20, 22.

Figure 2:
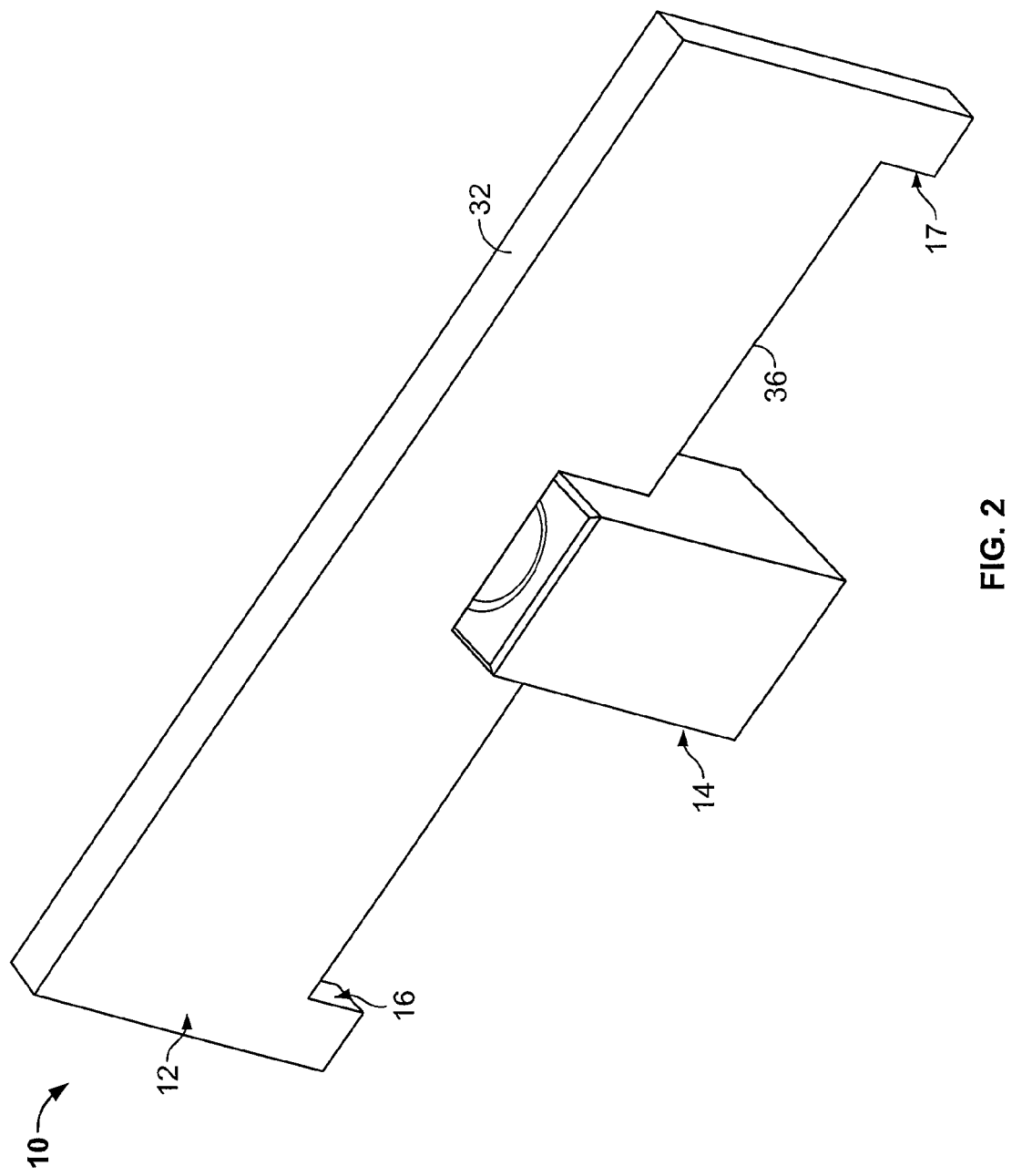
FIG. 2 is a perspective view of the anchor system.
Figure 4:
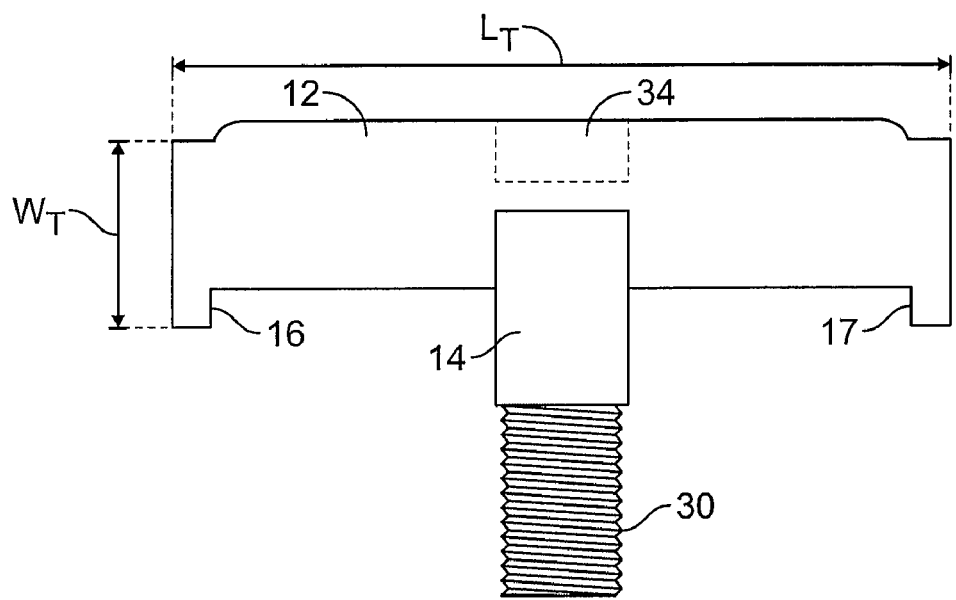
FIG. 4 is a side view of the anchor system coupled with a rod.
Figure 5:
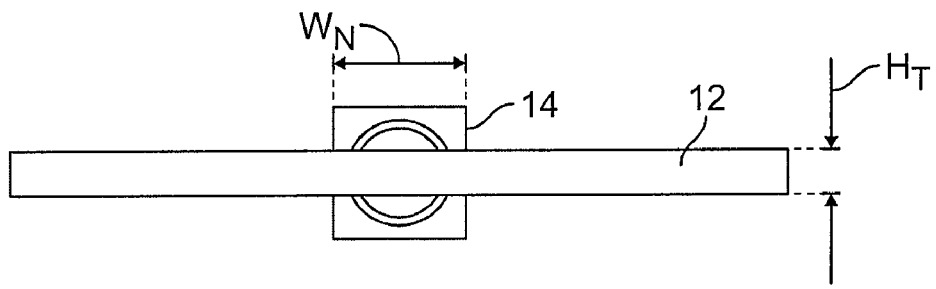
FIG. 5 is a top view of the anchor system.
Figure 6:
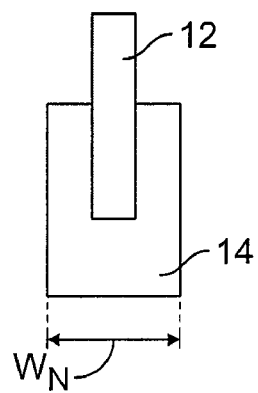
FIG. 6 is a side view of the anchor system.
Figure 7:
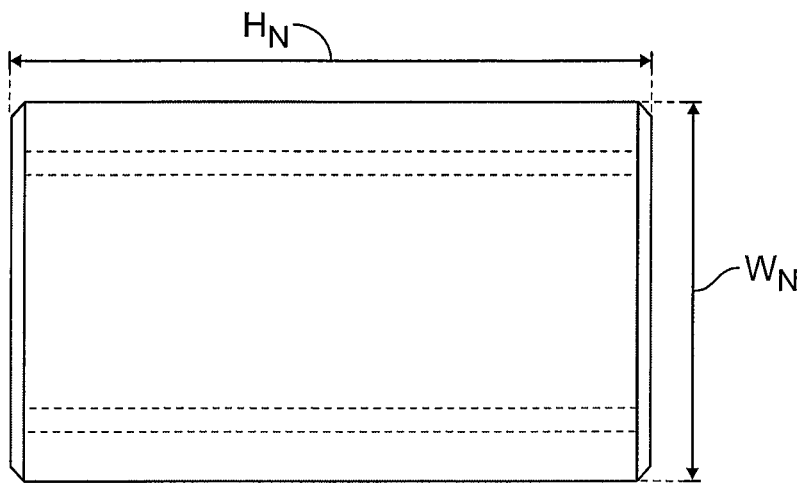
FIG. 7 is a side view of a square threaded block.
Figure 8:
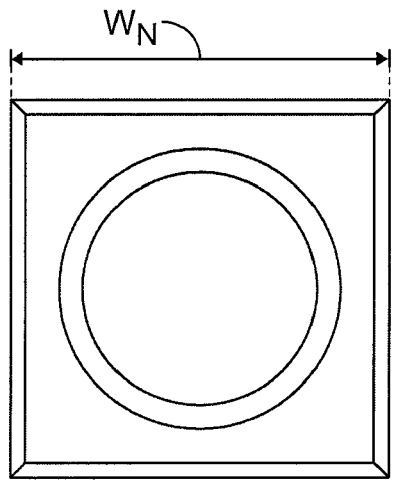
FIG. 8 is a top view of the square threaded block.

An embodiment of the universal suspended anchoring system 10 itself is shown in FIG. 2 and is comprised of a bracket 12 and a square threaded block 14. FIGS. 4, 5, and 6 illustrate an embodiment of the bracket 12 with a width $W_T$ of approximately 1.00 inch, a length $L_T$ of approximately 3.00 inches, and a height $H_T$ of approximately 0.125 inches is shown. The bracket can be manufactured from steel, but it also anticipated that it may be manufactured using other suitable materials known to those skilled in the art, including but not limited to aluminum, nylon, or plastic, or iron. The threaded block 14 is affixed, preferably welded to the bracket 12. The threaded block 14 can be welded to either a tabbed edge 36 of the T-bracket 12 as shown in FIG. 2, or welded to a flat side 32 of the T-bracket 12, as shown in phantom in FIG. 4, as indicated by 34. An embodiment of a square threaded block is shown in FIGS. 7 and 8, with a width $W_N$ approximately 0.50 inches and a height $H_N$ of approximately 0.88 inches.

The ability to weld the threaded block 14 to different sides of the T-bracket 12 allows the universal suspended anchor system 10 to be used in a variety of situations. For example, the T-bracket 12 has tabs 16, 17 formed at the lateral ends of the T-bracket 12. When the threaded block 14 is welded to a tabbed edge 36 of the T-bracket 12 as shown in FIG. 2, the tabs 16, 17 of the T-bracket 12 are configured to engage the bearing surfaces 24, 26 of the angle irons 20, 22 to restrict or reduce rotational movement of the universal suspended anchor system 10. In the alternative, the threaded block 14 can be welded to a flat side of the bracket 12 when clearance is an issue and a flat surface is needed against the bearing surfaces (e.g., the top chord) 24, 26.

Figure 3:
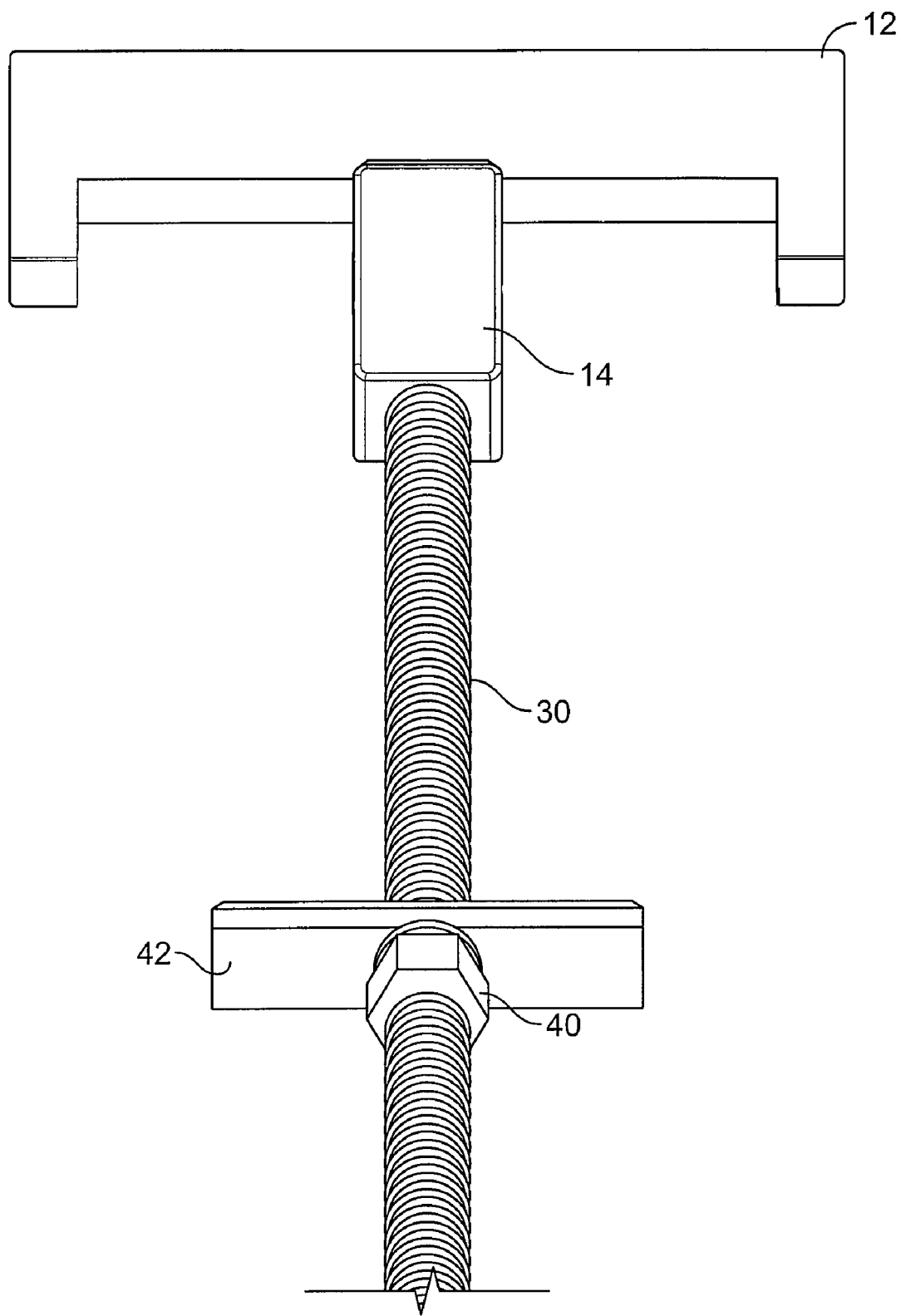
FIG. 3 is a perspective view of the anchor system shown with a threaded rod and a (seismic restraint) threaded block and washer.

To mount the universal suspended anchor system 10 to the truss 18, a rod 30 is coupled with the threaded block 14, as shown in FIG. 3. The end user is able to chose (or cut) the appropriate type and length of rod 30 necessary for the particular application, such as a shorter rod for low ceilings or a longer rod for higher ceilings and trusses, rather than be restricted by predetermined rod lengths. From below, a user may then raise the rod 30, which has been coupled to the universal suspended anchor system 10, and affix the anchor system 10 coupled to the rod 30 to the overhead trusses, mounting the anchor system 10 on the bearing surfaces 24, 26 and between the vertical walls of the angle irons 20, 22.

The mounted anchor system 10 is restrained in the truss in two ways: first, the square threaded block 14 is fitted between the vertical walls of the angle irons 20, 22, the walls holding to the sides of the threaded block 14. Second, the anchor is restrained by engaging the bracket tabs 16, 17 with the bearing surfaces 24, 26 of the angle irons 20, 22. By installing the anchor system 10 in such a manner, the need for welding or bolting an anchor system to a truss is eliminated.

Engaging both of the bracket tabs 16, 17 with the bearing surfaces 24, 26 of the two angle irons 20, 22, not only provides a means of restraint and reduces rotational movement, it also acts to distribute the load L of the anchor system 10 uniformly over two angle irons rather than one. Where prior industrial hangers are attached to one side of a joist and therefore, exhibit uneven load conditions across the joist, the present anchor system distributes the load L uniformly over two joists, creating more stability and reducing stress on both the truss 18 and the anchor system 10.

Figure 9:
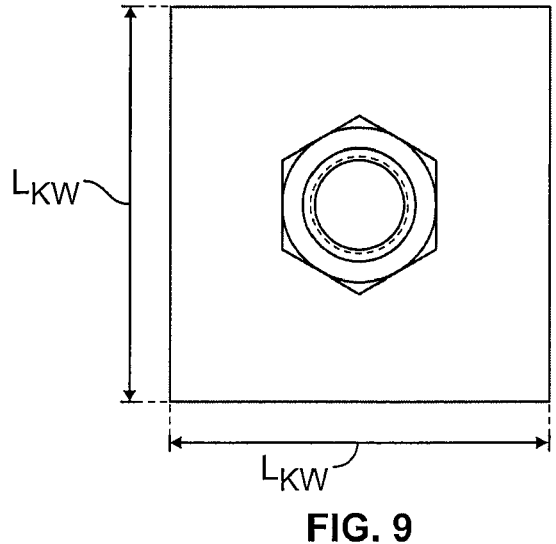
FIG. 9 is a top view of an embodiment of a threaded block and washer assembly.
Figure 10:
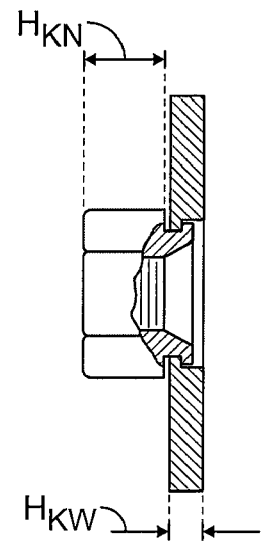
FIG. 10 is a side view of the threaded block and washer assembly for FIG. 9.
Figure 11:
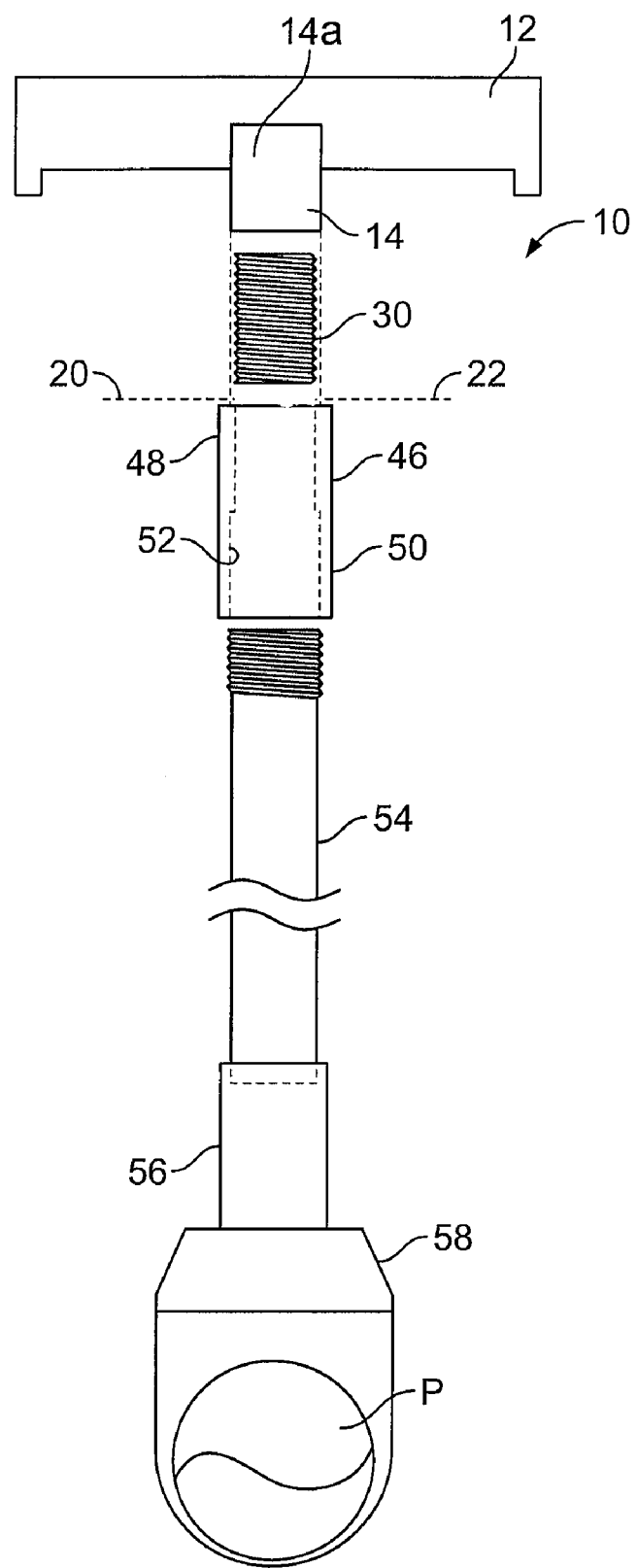
FIG. 11 is an exploded view of a seismic hanger using the present universal suspended anchor system.

In one use of the anchor system 10, the threaded rod 30 is coupled to a nut 40, such as a KEPS® nut and a lock washer/plate 42, such as a KEPS® lock washer, as shown in FIG. 3, to further stabilize and reduce movement of the anchor system 10. The KEPS® nut and lock washer/plate are commercially available from ITW Shakeproof of Elgin, Ill. FIGS. 9 and 10 illustrate an embodiment of the anchor system 10, in which the nut 40 and lock washer 42 are tightened up against the bottom (as indicated generally at 44 in FIG. 1) of the truss system 18 to secure the hanger 10 in place.

In one embodiment using the KEPS® nut and washer assembly, the KEPS® washer is a 1.53 inch square washer ($L_{KW}$ is approximately 1.53 inches) with a height $H_{KW}$ of approximately 0.13 inches. The KEPS® nut is shown with a height $H_{KN}$ of approximately 0.32-0.36 inches. The KEPS® nut and lock washers inhibit vibration and loosening, alleviating rattles and slippage of the anchor system 10.

In one use in which seismic considerations are taken into account, the anchor system 10 include the bracket 12 and square nut 14 and a relatively short threaded rod 30 that is engaged with the square nut 14. A coupling 46 is threadedly engages with the rod 30 on one end 48 and includes, at an opposite end 50, an internal thread 52 (national pipe thread—NPT) for mating with a length of pipe 54. The pipe 54 extends to, for example, a second coupling 56/clevis 58 for supporting the pipe P. The upper coupling 46 can be sized such that when it is threaded onto the rod 30, it also snugs up against the truss system 20, 22 to secure the bracket 12 in place on the truss system 20, 22. At the same time, the rigid pipe 54 provides sufficient strength and stiffness to account for seismic activity.

It will be appreciated that the present anchor system 10, with or without the seismic restraint can be readily installed from below the truss 18 by inserting the bracket 12/block 14 assembly between the angle irons 20, 22, until the bracket and nut 12, 14 clear the tops (bearing surfaces 24, 26 of the angles 20, 22), turning the hanger assembly 10 and resting the hanger 14 on the bearing surfaces 24, 26 of angle irons 20, 22, respectively. In addition, the square block 14 provides an indication of the orientation of the bracket. In that the block 14 is square, it can be determined that the bracket 12 is properly resting on the truss system when a face side 14a of the block 14 is perpendicular to the direction of the truss members.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A universal suspended anchor system for attaching to an associated frame, the frame having a first vertical wall and a second vertical wall, the first vertical wall having a first bearing surface and the second vertical wall having a second bearing surface, the first and second bearing surfaces adjacent to and aligned with one another and wherein a gap is formed between the adjacent bearing surfaces, the universal suspended anchor system comprising:

a T-shaped bracket, the T-shaped bracket having a top T-portion and a cutout formed in a lower edge of the T-portion, about central thereof; and a rectangular cross-section threaded block, wherein the threaded block is affixed to the T-portion within the cutout and the threaded block define a unitary member for insertion into the gap and suspension from the associated frame with the lower edge of the T-portion resting on the first and second bearing surfaces, the threaded block configured to reside within the gap and to accept a plurality of different-lengthed threaded rods.

2. The universal suspended anchor system in accordance with claim 1 wherein the unit is restrained between the first vertical wall and the second vertical wall.

3. The universal suspended anchor system in accordance with claim 1 wherein the threaded block is a square threaded block.

4. The universal suspended anchor system in accordance with claim 1 wherein the universal suspended anchor system is a seismic restraint.

5. The universal suspended anchor system in accordance with claim 3 wherein the threaded block is welded to the bracket.

6. The universal suspended anchor system in accordance with claim 3 wherein the threaded block is threaded internally.

7. The universal suspended anchor system in accordance with claim 3 wherein the threaded block is coupled to a threaded rod.

8. The universal suspended anchor system in accordance with claim 3 wherein the T-bracket has a first tab and a second tab.

9. The universal suspended anchor system in accordance with claim 7, including a lock nut and washer on the threaded rod spaced from the threaded block.

10. The universal suspended anchor system in accordance with claim 8 wherein the first and second tabs are configured to engage the first and second bearing surfaces, respectively.

11. A universal suspended anchor system for attaching to a frame, the frame having a first vertical wall and a second vertical wall, the first vertical wall having a first bearing surface and the second vertical wall having a second bearing surface, the first and second bearing surfaces adjacent to and aligned with one another and wherein a gap is formed between the adjacent bearing surfaces, the universal suspended anchor system comprising:

a multi-sided threaded block, the threaded block configured to accept a plurality of different-lengthed threaded rods; and a T-bracket, wherein the threaded block is welded to a first and/or a second side of the T-bracket to form an integral unit, the threaded block having a width dimension that is greater than a width dimension of the T-bracket, and the T-bracket having a length dimension that is greater than a length dimension of the threaded block and wherein the T-bracket has a first tab and a second tab at respective ends thereof.

12. The universal suspended anchor system in accordance with claim 11 wherein the first tab is engaged with the first bearing surface and the second tab is engaged with the second bearing surface to restrain rotational movement of the T-bracket.

13. The universal suspended anchor system in accordance with claim 11 wherein the threaded block is engaged with a threaded rod.

14. The universal suspended anchor system in accordance with claim 11 wherein the universal suspended anchor system is a seismic restraint.

* * * * *

UNITED STATES PATENT AND TRADEMARK OFFICE
CERTIFICATE OF CORRECTION

| | | |
|---|---|---|
| PATENT NO. | : 7,819,371 B2 | Page 1 of 1 |
| APPLICATION NO. | : 11/772351 | |
| DATED | : October 26, 2010 | |
| INVENTOR(S) | : Panasik et al. | |

It is certified that error appears in the above-identified patent and that said Letters Patent is hereby corrected as shown below:

Column 4, Line 62: The phrase -- and wherein the bracket -- should be inserted before the phrase "and the threaded block" and should read "within the cutout and wherein the bracket and the threaded block define a unitary".

Signed and Sealed this
Fifteenth Day of November, 2011

David J. Kappos
*Director of the United States Patent and Trademark Office*